United States Patent
Huang

(10) Patent No.: US 7,813,058 B2
(45) Date of Patent: Oct. 12, 2010

(54) OPTICAL LENS GROUP AND RELATED LENS MODULE

(75) Inventor: Chien-Feng Huang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/247,402

(22) Filed: Oct. 8, 2008

(65) Prior Publication Data
US 2009/0244725 A1 Oct. 1, 2009

(30) Foreign Application Priority Data
Mar. 25, 2008 (CN) ............... 2008 1 0300704

(51) Int. Cl.
*G02B 9/04* (2006.01)
(52) U.S. Cl. ...................................... 359/793
(58) Field of Classification Search .......... 359/796, 359/754, 793
See application file for complete search history.

(56) References Cited

U.S. PATENT DOCUMENTS 7,522,355 B2 * 4/2009 Uehira et al. ............... 359/793

* cited by examiner

*Primary Examiner*—Jack Dinh
(74) *Attorney, Agent, or Firm*—Andrew C. Cheng

(57) ABSTRACT

An exemplary optical lens group includes a first lens and a second lens. The first lens comprises a first central portion and an annular stepped portion. The annular stepped portion has a first outer step and a second outer step. The first outer step has a first outer side surface and a first downward-facing step surface. The second outer step has a second outer side surface and a second downward-facing step surface. The second lens comprises a second central portion and a peripheral portion. The peripheral portion has an inner side surface. The first lens is engaged in the second lens in a manner that the first outer side surface of the first lens is in contact with the inner side surface of the second lens. The second outer side surface of the first lens is spaced apart from the inner side surface of the second lens.

4 Claims, 4 Drawing Sheets

OPTICAL LENS GROUP AND RELATED LENS MODULE

CROSS-REFERENCE TO RELATED APPLICATIONS

This application is related to commonly-assigned copending applications Ser. No. 12/061,893, entitled "Lens with Collar and Lens Module Using same", and Ser. No. 12/168,785, entitled "Lens Module and Optical Module Incorporating the same". Disclosures of the above-identified applications are incorporated herein by reference.

BACKGROUND

1. Technical Field

The present invention relates to optical imaging devices and, particularly, to an optical lens group and a lens module.

2. Description of Related Art

Currently, along with the development of electronic devices having multiple functions, image pick-up apparatuses have become widely used in a variety of consumer electronic devices, such as notebook computers, personal digital assistants (PDAs), cellular telephones, etc. In the meantime, demand for improving image quality is increasing, which essentially depends on the quality of a lens module of the image pick-up apparatus. That is, a lens module with high image quality is desired.

Referring to FIG. 4, an optical lens group 20 includes two lenses 24, 26. The lens 24 and lens 26 each has a central portion and a peripheral portion. The peripheral portion of the lens 24 includes a protuberance 242, and the peripheral portion of the lens 26 includes a protuberance 262 coupled with the protuberance 242. The protuberance 242 has a surface 244 and the protuberance 262 has a surface 264. The two surfaces 244, 264 are both incline planes and have the same gradient. When assembling the two lenses 24 and 26, the surfaces 244 and 264 contact each other to fix the lens 24 with the lens 26. However, this combination requires the surfaces 244 and 264 to be manufactured very precisely. Furthermore, the friction force between the surface 244 and the surface 264 may cause the deformation of the two lenses 24, 26. The larger the contact area between the surface 244 and the surface 264 is, the larger the friction force between the two lenses 24, 26 is. Due to the friction force, the lens 24 may be inclined relative to the lens 26 after the lens 24 coupled to the lens 26. Therefore, the optical axis of the lenses 24 and 26 may be not aligned to each other. Thus, images generated by a lens module having the above optical lens group 20 may be distorted, for example change in shape or fuzziness.

Therefore, a new optical lens group is desired to overcome the above mentioned problems.

SUMMARY

An exemplary optical lens group includes a first lens and a second lens. The first lens comprises a first central portion and an annular stepped portion. The annular stepped portion has a first outer step and a second outer step. The first outer step has a first outer side surface and a first downward-facing step surface. The second outer step has a second outer side surface and a second downward-facing step surface. The second lens comprises a second central portion and a peripheral portion. The peripheral portion has an inner side surface. The first lens is engaged in the second lens in a manner that the first outer side surface of the first lens is in contact with the inner side surface of the second lens. The second outer side surface of the first lens is spaced apart from the inner side surface of the second lens.

Other advantages and novel features of the present invention will become more apparent from the following detailed description of present embodiment when taken in conjunction with the accompanying drawings.

BRIEF DESCRIPTION OF THE DRAWINGS

The components in the drawings are not necessarily drawn to scale, the emphasis instead being placed upon clearly illustrating the principles of the present embodiment. Moreover, in the drawings, like reference numerals designate corresponding parts throughout the several views.

Figure 1:
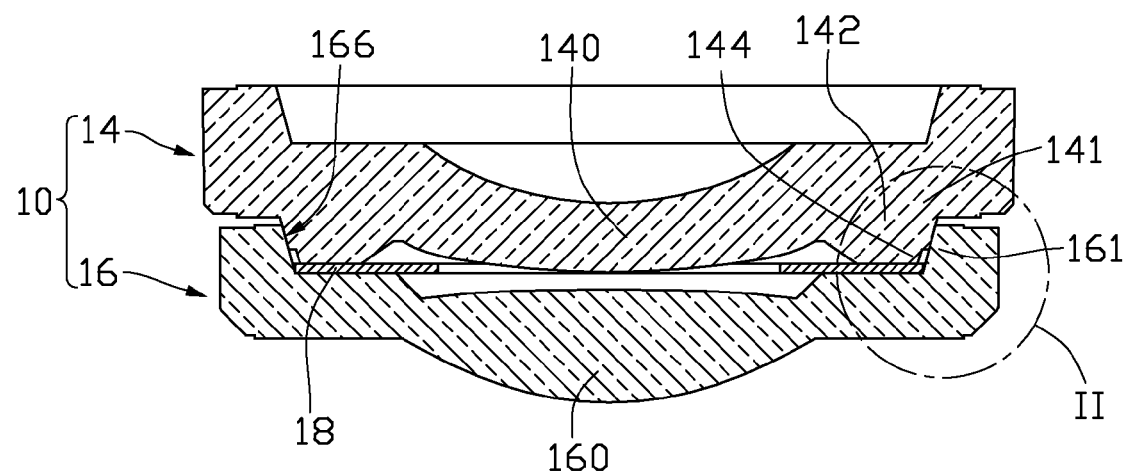
FIG. 1 is an assembled, cross-sectional view of an optical lens group according to an exemplary embodiment.

Corresponding reference characters indicate corresponding parts. The exemplifications set out herein illustrate at least one present embodiment of the present lens module and optical module, in one form, and such exemplifications are not to be construed as limiting the scope of the invention in any manner.

DETAILED DESCRIPTION OF THE EMBODIMENTS

Reference will now be made to the drawings to describe embodiments of the present optical lens group in detail.

Figure 2:
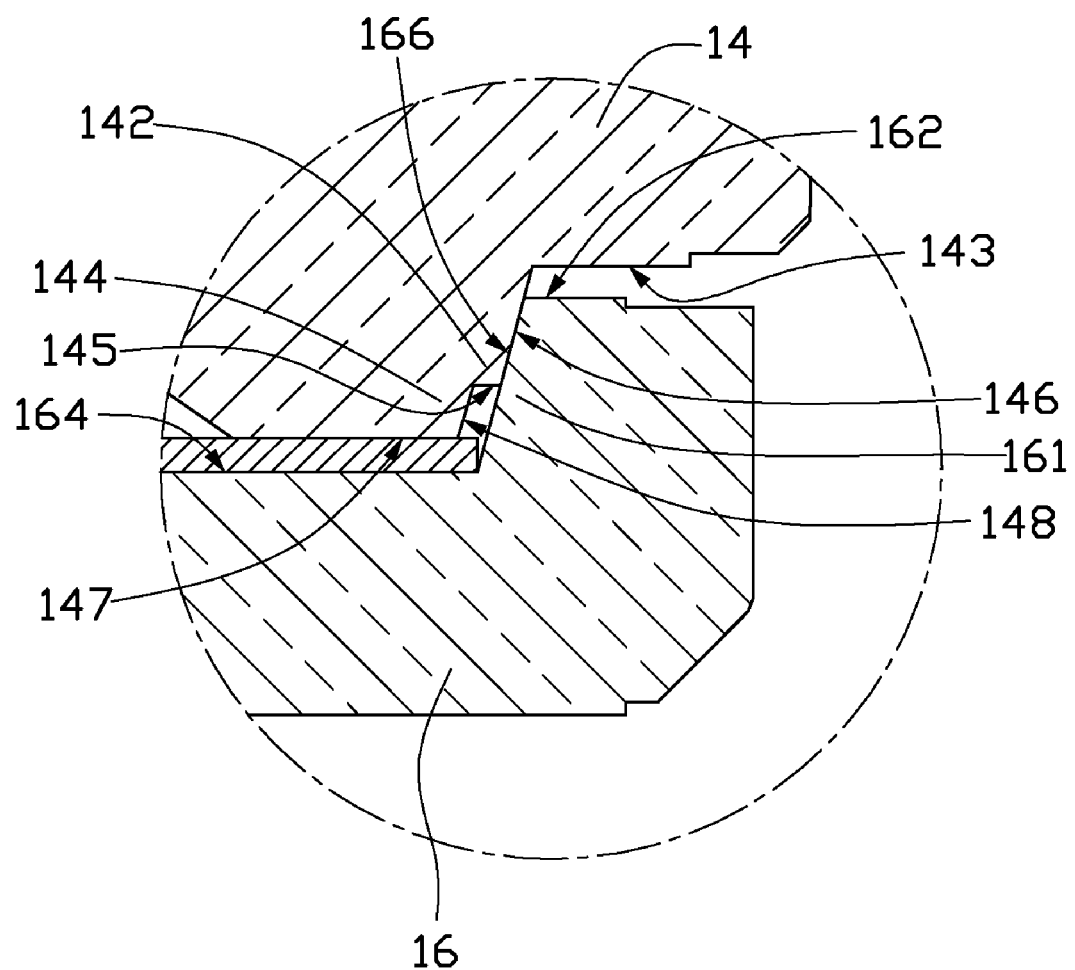
FIG. 2 is an enlarged view of an area II of the optical lens group shown in FIG. 1.

Referring to FIG. 1 to FIG. 2, an optical lens group 10 of an exemplary embodiment is shown. The optical lens group 10 includes a first lens 14 and a second lens 16. The first lens 14 and the second lens 16 can be made of plastic, glass or other optical materials known by person skilled in the art.

The first lens 14 includes a first central portion 140 and an annular stepped portion 141 surrounding the first central portion 140. The first central portion 140 is configured for performing image picking-up function. The annular stepped portion 141 has a first outer step 142 and a second outer step 144. A bottom surface 143 is defined in the annual stepped portion 141. The first outer step 142 and the second outer step 144 are annular stages surrounding the first central portion 140 of the first lens 14 therein. The external diameter of the first outer step 142 is larger than that of the second outer step 144. The first outer step 142 has a first side outer surface 146 and a first downward-facing step surface 145. The second outer step 144 has a second outer side surface 148 and a second downward-facing step surface 147. The first side outer surface 146 adjoins the bottom surface 143 and the first downward-facing step surface 145. The second outer side surface 148 adjoins the first downward-facing step surface 145 and the second downward-facing step surface 147.

The second lens 16 includes a second central portion 160 and a peripheral portion 161 surrounding the second central portion 160. The second central portion 160 is configured for performing image picking-up function. The peripheral portion 161 has a first top surface 162, an inner side surface 166 adjoining the first top surface 162, and a second top surface 164 adjoining the inner side surface 166. That is, the inner side surface 166 adjoins the first top surface 162 and the second top surface 164.

The first lens 14 is engaged in the second lens 16 in a manner that the first outer side surface 146 of the first lens 14 is in contact with the inner side surface 166 of the second lens 16. The first and second outer steps 142, 144 taper in a direction toward the second lens 16. In the present embodiment, the first and second outer steps 142, 144 have a same tapering degree.

The second outer side surface 148 of the first lens 14 is spaced apart from the inner side surface 166 of the second lens 16. That is to say, a gap is defined between the first downward-facing step surface 145 of the first lens 14 and the second lens 16. So the contact area of the first lens 14 to the second lens 16 is reduced to reduce the friction force between the two lenses. In addition, the friction force between the second outer side surface 148 and the inner side surface 166 is eliminated to easily/safely assemble the optical lens group 10. The optical lens group 10 further includes a spacer 18 sandwiched between the first lens 14 and the second lens 16 to adjust the distance between the first lens 14 and the second lens 16.

In assembly, the first outer side surface 146 is guided by the inner side surface 166. The first outer side surface 146 contacts the inner side surface 166 to fix the first lens 14 to the second lens 16. The bottom surface 143 faces the first top surface 162. The second top surface 164 and the second downward-facing step surface 147 are positioned at opposite sides of the spacer 18. The second outer side surface 148 is spaced apart from the inner side surface 166. The first downward-facing step surface 145, the second outer side surface 148 and the inner side surface 166 cooperatively define a gap. Because the second outer side surface 148 does not contact the inner side surface 166, the deformation of the two lenses 14, 16 caused by friction is eliminated or reduced. Furthermore, the optical axes of the lenses 14 and 16 are coincident. Thus, a lens module having the optical lens group 10 can be more accurately assembled and have better photographic quality.

Figure 3:
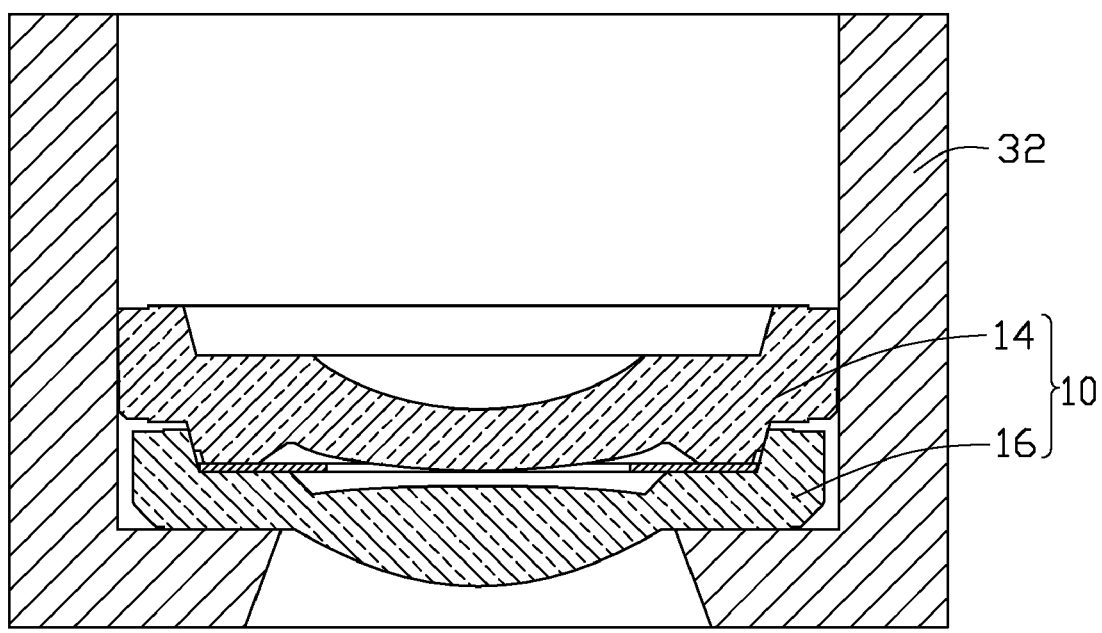
FIG. 3 is an assembled, cross-sectional view of a lens module according to an exemplary embodiment.
Figure 4:
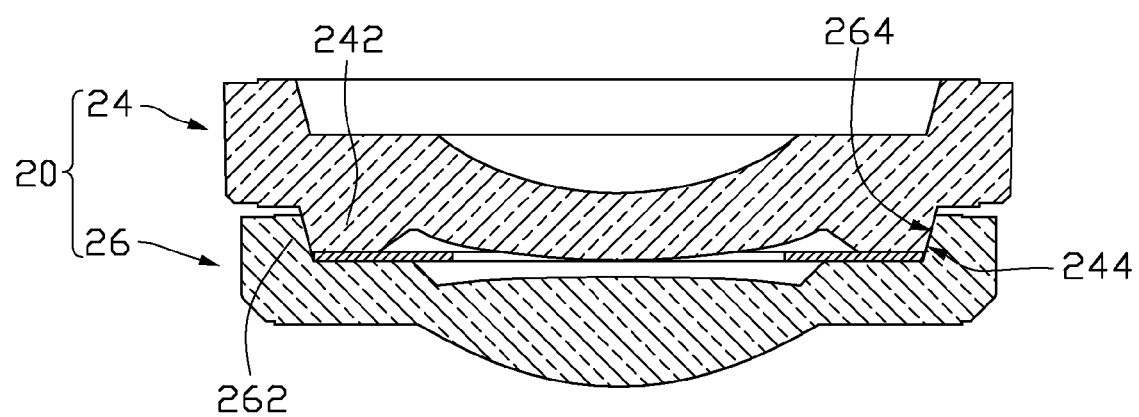
FIG. 4 is a schematic, cross-sectional view of a typical optical lens group.

Referring to FIG. 3, a lens module 30 of an exemplary embodiment of an environment utilizing the lens group 10 is shown. The lens module 30 includes a barrel 32. The barrel 32 is configured for receiving the optical lens group 10. In this embodiment, the lens module 30 can be installed into the electronic devices, such as notebook computers, personal digital assistants (PDAs), or cell phones.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. An optical lens group comprising:
a first lens comprising a first central portion and an annular stepped portion surrounding the first central portion, the annular stepped portion having a first outer step and a second outer step, the first outer step and the second outer step being annular stages surrounding the first central portion, the external diameter of the first outer step being larger than that of the second outer step, the first outer step having a first outer side surface and a first downward-facing step surface, the second outer step having a second outer side surface and a second downward-facing step surface, a bottom surface being defined in the annular stepped portion of the first lens, the first outer side surface adjoining the bottom surface and the first downward-facing step surface, and the second outer side surface adjoining the first downward-facing step surface and the second downward-facing step surface;
a second lens comprising a second central portion and a peripheral portion surrounding the second central portion, the peripheral portion having an inner side surface, a first top surface and a second top surface, the inner side surface adjoining the first top surface and the second top surface, the bottom surface facing the first top surface, the first lens engaged in the second lens in a manner that the first outer side surface of the first lens is in contact with the inner side surface of the second lens, and the second outer side surface of the first lens is spaced apart from the inner side surface of the second lens; and
a spacer sandwiched between the first lens and the second lens, the second top surface and the second downward-facing step surface positioned at opposite sides of the spacer.

2. A lens module comprising:
a first lens comprising a first central portion and an annular stepped portion surrounding the first central portion, the annular stepped portion having a first outer step and a second outer step, the first outer step and the second outer step being annular stages surrounding the first central portion, the external diameter of the first outer step being larger than that of the second outer step, the first outer step having a first outer side surface and a first downward-facing step surface, the second step having a second outer side surface and a second downward-facing step surface, a bottom surface being defined in the annular stepped portion of the first lens, the first outer side surface adjoining the bottom surface and the first downward-facing step surface, and the second outer side surface adjoining the first downward-facing step surface and the second downward-facing step surface;
a second lens comprising a second central portion and a peripheral portion surrounding the second central portion, the peripheral portion having an inner side surface, a first top surface and a second top surface, the inner side surface adjoining the first top surface and the second top surface, the bottom surface facing the first top surface, the first lens engaged in the second lens in a manner that the first outer side surface of the first lens is in contact with the inner side surface of the second lens, and the second outer side surface of the first lens is spaced apart from the inner side surface of the second lens;
a spacer sandwiched between the second downward-facing step surface of the first lens and the second lens, the second top surface and the second downward-facing step surface positioned at opposite sides of the spacer; and
a barrel receiving the first lens and the second lens therein.

3. The optical lens group as claimed in claim 1, wherein the first downward-facing step surface, the second outer side surface and the inner side surface cooperatively define a gap.

4. The lens module as claimed in claim 2, wherein the first downward-facing step surface, the second outer side surface and the inner side surface cooperatively define a gap.

* * * * *